US009926828B2

(12) United States Patent
Schwarz et al.

(10) Patent No.: US 9,926,828 B2
(45) Date of Patent: Mar. 27, 2018

(54) TAILPIPE COVER FOR AN EXHAUST SYSTEM OF A MOTOR VEHICLE AND EXHAUST SYSTEM HAVING SUCH A TAILPIPE COVER

(71) Applicant: Bayerische Motoren Werke Aktiengesellschaft, Munich (DE)

(72) Inventors: Wolfgang Schwarz, Munich (DE); Martin Haberstock, Hallbergmoos (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/237,696

(22) Filed: Aug. 16, 2016

(65) Prior Publication Data
US 2017/0009637 A1 Jan. 12, 2017

Related U.S. Application Data

(63) Continuation of application No. PCT/EP2015/055600, filed on Mar. 18, 2015.

(30) Foreign Application Priority Data

May 9, 2014 (DE) .................. 10 2014 208 722

(51) Int. Cl.
*F16L 9/02* (2006.01)
*F01N 13/08* (2010.01)
(Continued)

(52) U.S. Cl.
CPC ....... *F01N 13/082* (2013.01); *F01N 13/1805* (2013.01); *F01N 13/20* (2013.01); *F16L 9/02* (2013.01)

(58) Field of Classification Search
CPC ..... B21D 39/04; B21D 53/88; F01N 13/1805; F01N 13/082; F01N 2450/20; F01N 2470/24; Y10T 29/4994
(Continued)

(56) References Cited

U.S. PATENT DOCUMENTS 7,007,720 B1* 3/2006 Chase ................. F16L 59/12
138/110
8,550,122 B2* 10/2013 Derry ................. B21D 39/04
138/108
(Continued)

FOREIGN PATENT DOCUMENTS

DE 78 38 091 U1 7/1979
DE 195 17 462 A1 11/1995
(Continued)

OTHER PUBLICATIONS

International Search Report (PCT/ISA/210) issued in PCT Application No. PCT/EP2015/055600 dated Jun. 5, 2015 with English translation (Six (6) pages).
(Continued)

Primary Examiner — Patrick F Brinson
(74) Attorney, Agent, or Firm — Crowell & Moring LLP

(57) ABSTRACT

A tailpipe cover is provided for an exhaust system of a motor vehicle, including a cover pipe having a pipe axis, which can be fitted onto a tailpipe of the exhaust system, a plurality of fastening elements arranged on a radial inner side of the cover pipe for fixing the tailpipe cover to the tailpipe in a radial and axial direction, and a positioning element arranged on a radial inner side of the cover pipe for positioning the tailpipe cover in a circumferential direction relative to the tailpipe.

20 Claims, 2 Drawing Sheets

(51) Int. Cl.
  *F01N 13/18* (2010.01)
  *F01N 13/20* (2010.01)

(58) Field of Classification Search
  USPC ......... 138/108–110, 112, 113, 148; 181/227, 181/249
  See application file for complete search history.

(56) References Cited

U.S. PATENT DOCUMENTS

| | | | | |
|---|---|---|---|---|
| 8,875,836 | B2* | 11/2014 | Park | F01N 13/082 181/227 |
| 9,346,350 | B2* | 5/2016 | Nowka | |
| 2010/0212767 | A1* | 8/2010 | Derry | B21D 39/04 138/108 |
| 2014/0326350 | A1* | 11/2014 | Riley | F01N 13/082 138/108 |

FOREIGN PATENT DOCUMENTS

| | | |
|---|---|---|
| DE | 10 233 498 A1 | 1/2004 |
| DE | 203 18 560 U1 | 2/2005 |
| DE | 10 2012 008 243 A1 | 10/2013 |
| JP | 55-94421 | 6/1980 |
| JP | 59-32118 U | 2/1984 |
| JP | 2004-324553 A | 11/2004 |
| JP | 2005-2891 A | 1/2005 |
| JP | 2008-190370 A | 8/2008 |
| JP | 2010-133378 A | 6/2010 |

OTHER PUBLICATIONS

German-language Written Opinion (PCT/ISA/237) issued in PCT Application No. PCT/EP2015/055600 dated Jun. 5, 2015 (Seven (7) pages).
German-language Search Report issued in counterpart German Application No. 10 2014 208 722.8 dated Nov. 26, 2014 with partial English translation (Thirteen (13) pages).

* cited by examiner

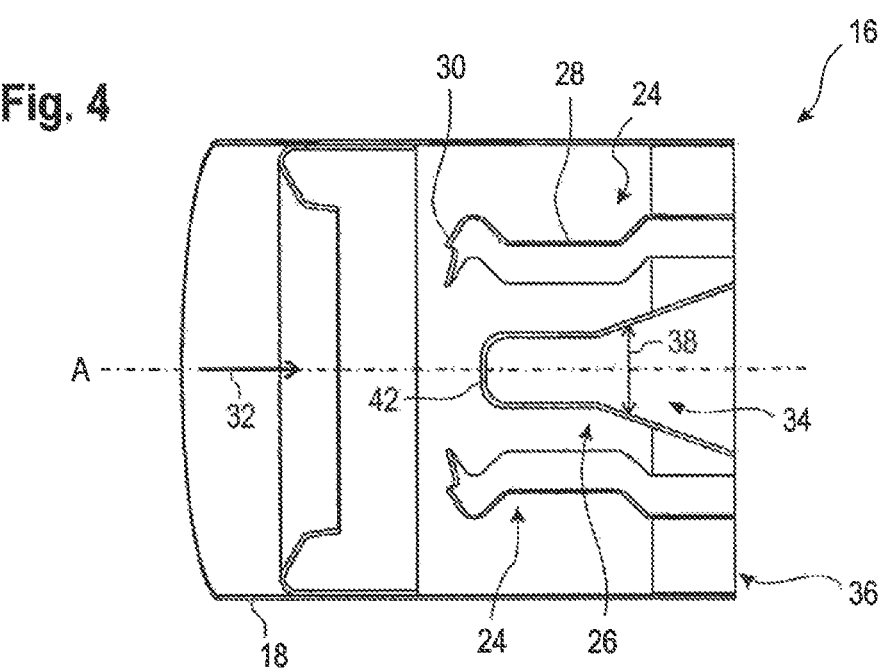

TAILPIPE COVER FOR AN EXHAUST SYSTEM OF A MOTOR VEHICLE AND EXHAUST SYSTEM HAVING SUCH A TAILPIPE COVER

CROSS REFERENCE TO RELATED APPLICATIONS

This application is a continuation of PCT International Application No. PCT/EP2015/055600, filed Mar. 18, 2015, which claims priority under 35 U.S.C. § 119 from German Patent Application No. 10 2014 208 722.8, filed May 9, 2014, the entire disclosures of which are herein expressly incorporated by reference.

BACKGROUND AND SUMMARY OF THE INVENTION

The invention relates to an exhaust system of a motor vehicle as well as to a tailpipe cover for such an exhaust system, including a cover pipe having a pipe axis, which cover pipe can be fitted onto a tailpipe of the exhaust system.

Exhaust systems for motor vehicles, in which a tailpipe cover for the tailpipe of the exhaust system is provided, are generally known from the state of the art.

Since the tailpipe cover is frequently added on by the vehicle owner as an individual decorative trim or tuning part, a constructively simple design of the tailpipe cover as well as an easy mounting are desirable. Thus, as an alternative to a welding of the tailpipe cover to the tailpipe of the exhaust system, embodiments also have become customary in which the tailpipe cover is fitted onto the tailpipe of the exhaust system and fixed to the tailpipe by a clamped connection.

Particularly in the case of a slanted pipe end of the cover pipe, it is further necessary to define a desired positioning of the tailpipe cover relative to the tailpipe in the circumferential direction. According to the state of the art, for example, an axial slot is provided for this purpose in the cover pipe, into which axial slot a radially projecting positioning pin engages that is provided in the tailpipe.

It is an object of the present invention to provide a tailpipe cover for an exhaust system of a motor vehicle that has a constructively simple design and can be fastened to the tailpipe at low expenditures in a reliable, easily mountable and visually advantageous manner.

According to the invention, this object is achieved by a tailpipe cover for an exhaust system of a motor vehicle, which includes a cover pipe that has a pipe axis and can be fitted onto a tailpipe of the exhaust system, a plurality of fastening elements arranged on a radial interior side of the cover pipe for fixing the tailpipe cover to the tailpipe in the radial direction and in the axial direction, as well as a positioning element arranged on a radial interior side of the cover pipe for positioning the tailpipe cover relative to the tailpipe in the circumferential direction. The fixing as well as the positioning of the tailpipe cover therefore takes place in a protected manner in the interior of the cover pipe. This is visually advantageous as well as advantageous with respect to the mounting because, after a mounting of the tailpipe cover, no fastening or positioning aids are visible from the outside. And, during the mounting, there is no risk that, when reaching around and fitting the tailpipe cover, the mechanic may catch his fingers between mutually engaging parts that can be moved relative to one another.

The cover pipe is preferably designed essentially without a slot or a borehole. The cover pipe can therefore be produced with minimal expenditures by simply cutting a basic pipe to size. In addition, a construction that has no slot and borehole is particularly advantageous visually and with respect to the mounting.

The fastening elements may, for example, be radially elastic fastening clamps and/or fastening claws. In this manner, the tailpipe cover can be radially and axially fixed to the tailpipe at minimal expenditures.

The positioning element preferably has a recess which extends in the axial direction and forms an axial guide. By means of this axial guide of the tailpipe cover relative to the tailpipe, an undesired relative rotation between the cover pipe and the tailpipe during the axial fitting-on of the tailpipe cover will be reliably prevented.

The recess of the positioning element, viewed in the axial direction, may have a changeable tangential dimension, in which case, the recess, viewed in the axial direction, tapers tangentially, particularly at least in sections. During the fitting-on of the tailpipe cover, this initially permits a certain tolerance when aligning the tailpipe cover relative to the tailpipe in the circumferential direction.

This object is further achieved by an exhaust system of a motor vehicle having a tailpipe that has an essentially cylindrical pipe end section with a free pipe end, and the above-mentioned tailpipe cover that is fitted onto the free pipe end of the tailpipe, wherein the fastening elements of the tailpipe cover are radially acted upon with respect to the tailpipe and are radially supported on an exterior side of the tailpipe. The pipe end section of the tailpipe has a radial tailpipe projection which engages in a recess of the positioning element of the tailpipe cover. The exhaust system thereby permits a precise positioning of the tailpipe cover in the circumferential direction as well as a simple and reliable fastening of the tailpipe cover to the tailpipe in the radial and axial direction while the constructive expenditures are minimal.

According to a preferred embodiment of the exhaust system, the tailpipe projection and the recess establish an interlocking connection that is largely play-free in the circumferential direction in a final mounted position of the tailpipe cover.

It is thereby ensured at low expenditures that the tailpipe cover and the tailpipe take up a desired position in the circumferential direction in a reliable and precise manner and are permanently held in this position.

The recess is preferably designed as an axial guide for the tailpipe projection, so that the tailpipe cover is axially guided during the fitting onto the tailpipe, and therefore no undesired relative rotation will occur between the cover pipe and the tailpipe.

Furthermore, the positioning element in a final mounted position of the tailpipe cover can form an axial stop for the tailpipe projection. As a result, an axial final mounted position of the tailpipe cover relative to the tailpipe can also be defined in a simple and reliable manner by the positioning element.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a further longitudinal sectional view of the tailpipe cover according to FIG. 2.

DETAILED DESCRIPTION OF THE DRAWINGS

It is first pointed out that components which functionally correspond to one another have identical reference numbers within the scope of the application, the reference numbers of components known from the state of the art being additionally provided with an apostrophe.

Figure 1:
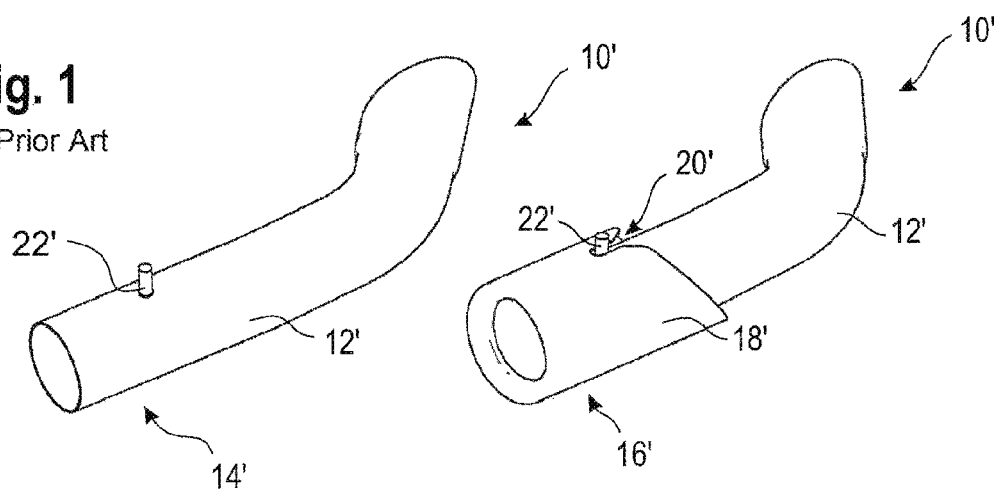
FIG. 1 contains two perspective views of a tailpipe of an exhaust system known from the state of the art before and after the mounting of a conventional tailpipe cover.

FIG. 1 shows two perspective cutouts of a conventional exhaust system 10' of a motor vehicle in the area of a tailpipe 12', concretely of a pipe end section 14' of the tailpipe 12'. The pipe end section 14' is shown on the left side before the mounting and on the right side after the mounting of the tailpipe cover 16' known from the state of the art.

The tailpipe cover 16' has a cover pipe 18' which is axially fitted onto the pipe end section 14'. For positioning the tailpipe cover 16' relative to the tailpipe 12' in the circumferential direction, the cover pipe 18' has an axial slot 20' and the pipe end section 14' has a radial tailpipe projection 22' which, in a final mounted position of the tailpipe cover 16' according to FIG. 1 (right side), engages in the slot 20' of the cover pipe 18'.

The slot 20' and the tailpipe projection 22' are used as a positioning aid for positioning the tailpipe cover 16' relative to the tailpipe 12' in the circumferential direction. In this case, the positioning aid will be visible from the outside which, with respect to a decorative trim or tuning element, such as the tailpipe cover 16', is generally undesirable, if only for reasons of appearance. Furthermore, there is the risk that, when mounting the tailpipe cover 16' and reaching around and fitting the cover pipe 18', the mechanic could catch his fingers between the radial tailpipe projection 22' and the slot 20'.

Figure 2:
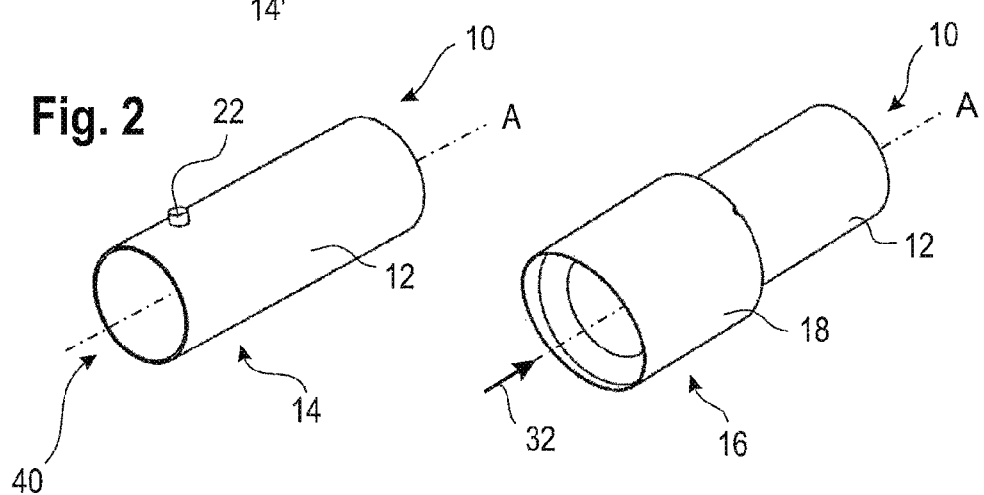
FIG. 2 contains two perspective views of a tailpipe of an exhaust system according to an embodiment of the invention before and after the mounting of the tailpipe cover according to an embodiment of the invention.

FIG. 2 contains two perspective cutouts of an exhaust system of a motor vehicle according to an embodiment of the invention in the area of a tailpipe 12, in which a pipe end section 14 of the tailpipe 12 before the mounting is illustrated on the left side, and the pipe end section 14 is illustrated on the right side after the mounting of a tailpipe cover 16 according to an embodiment of the invention.

Figure 3:
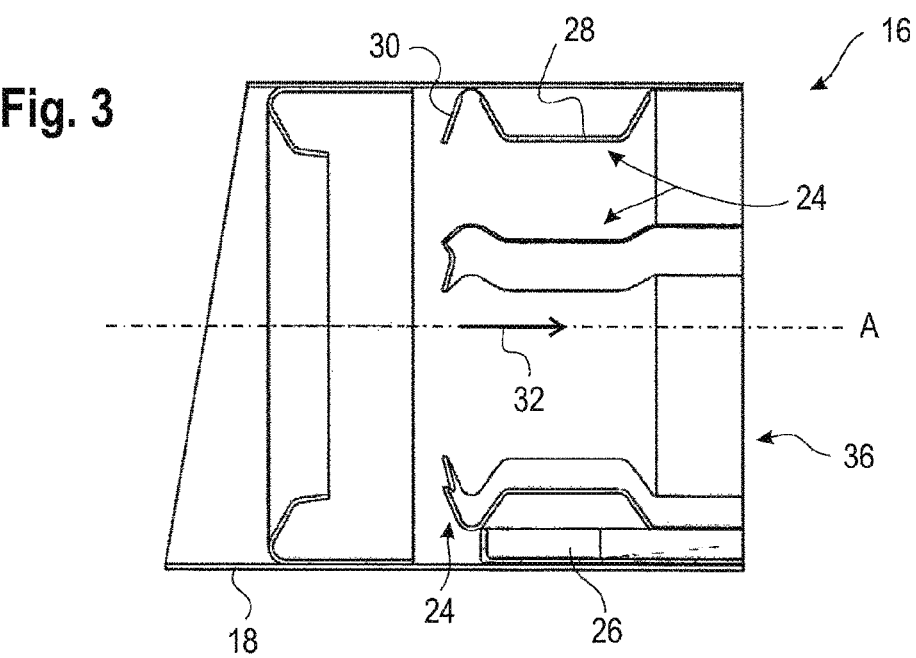
FIG. 3 is a longitudinal sectional view of the tailpipe cover according to FIG. 2.

In order to be able to better recognize the constructive design of the tailpipe cover 16 according to FIG. 2, FIGS. 3 and 4 each are longitudinal sectional views of this tailpipe cover 16.

According to FIGS. 3 and 4, the tailpipe cover 16 for the exhaust system 10 of a motor vehicle has an essentially circular-cylindrical cover pipe 18 that has a pipe axis A and can be fitted onto the tailpipe 12 of the exhaust system 10 according to FIG. 2. A plurality of fastening elements 24 are arranged on a radial interior side of the cover pipe 18 for fixing the tailpipe cover 16 at the tailpipe 12 in the radial direction and in the axial direction. A positioning element 26 is arranged on a radial interior side of the cover pipe 18 for positioning the tailpipe cover 16 relative to the tailpipe 12 in the circumferential direction.

In this case, the cover pipe 18 is designed essentially without a slot and borehole, so that no positioning aids are present on the radial exterior side of the cover pipe 18, which positioning aids would impair an easy mounting and the appearance of the tailpipe cover. The fastening elements 24 as well as the positioning element 26 are preferably formed stamped parts made of sheet metal, which are permanently fastened to a radial interior side of the cover pipe 18, for example, by means of a welded connection.

The fastening elements 24 include several radially elastic fastening clamps and/or fastening claws evenly distributed in the circumferential direction, each fastening element 24 in the present embodiment having a radially elastic clamping section 28 as well as a radially elastic claw section 30. In this case, the clamping section 28 mainly provides the radial clamping force between the tailpipe 12 and the cover pipe 18, while the claw section 30 permits an axial motion of the tailpipe cover 16 relative to the tailpipe 12 in the mounting direction with low mounting resistance but counteracts an axially opposite motion in the demounting direction with a clearly higher demounting resistance. During the mounting, the tailpipe cover 16 can therefore comparatively easily be fitted onto the tailpipe 12 and, after the mounting, will nevertheless be connected with the tailpipe 12 in a secure and reliable manner.

It is easily recognizable in FIG. 4 that the positioning element 26 has a groove-shaped recess 34 which, starting from a pipe end 36 of the cover pipe 18, extends in the axial direction and forms an axial guidance for a radial tailpipe projection 22 (compare FIG. 2, left) provided on the tailpipe 12.

Viewed in the axial direction, the recess 34 of the positioning element 26 has a changeable tangential dimension 38, in which case the recess 34 according to FIG. 4, starting from the pipe end 36 tangentially tapers in the axial direction at least in sections. At the beginning of the mounting operation, this permits a certain tolerance when positioning the tailpipe cover 16 relative to the tailpipe 12 in the circumferential direction.

According to FIG. 2, the exhaust system 10 includes the tailpipe 12, which has an essentially circular-cylindrical pipe end section 14 with a free pipe end 40, as well as the above-described tailpipe cover 16, which, with the forward pipe end 36, is fitted onto the free pipe end 40 of the tailpipe 12 and encloses the pipe end section 14. In this case, the fastening elements 24 of the tailpipe cover 16 are acted upon radially with respect to the tailpipe 12 and support themselves radially on an exterior side of the tailpipe 12.

The radial tailgate projection 22 is provided at the pipe end section 14 of the tailpipe 12 and projects radially to the outside and engages in the recess 34 of the positioning element 26 of the tailgate cover 16. In this case, the tailpipe projection 22 and the recess 34 establish an interlocking connection that is largely play-free in the circumferential direction in a final mounted position of the tailpipe cover 16 (FIG. 2, on the right). The tailpipe projection 22 is, for example, a metal pin welded to the radial exterior side of the tailpipe 12.

According to FIG. 4, the recess 34 is particularly designed as an axial guidance for the tailpipe projection 22, so that the tailpipe cover 16 is axially guided during the fitting onto the tailpipe 12.

The recess 34 of the positioning element 26 is optionally bounded by an axial front wall 42, so that the positioning element 26 forms an axial stop for the tailpipe projection 22 and in this manner defines the final mounted position of the tailpipe cover 16 (FIG. 2, on the right).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tailpipe cover for an exhaust system of a motor vehicle, comprising:
   a cover pipe that has a pipe axis and is fittable onto a tailpipe of the exhaust system;
   a positioning element arranged on a radial interior side of the cover pipe; and
   a plurality of fastening elements arranged separately from the positioning element on the radial interior side of the cover pipe, the plurality of fastening elements being configured to fix the tailpipe cover to the tailpipe in a radial direction and in an axial direction, wherein
   the positioning element is configured to position the tailpipe cover relative to the tailpipe in a circumferential direction.

2. The tailpipe cover according to claim 1, wherein the cover pipe has an essentially slot-free and borehole-free design.

3. The tailpipe cover according to claim 1, wherein the fastening elements comprise radially elastic fastening clamps and fastening claws that are provided at ends of the fastening elements.

4. The tailpipe cover according to claim 1, wherein the positioning element has a recess which extends in the axial direction and forms an axial guide.

5. The tailpipe cover according to claim 4, wherein the recess of the positioning element, viewed in the axial direction, has a changeable tangential dimension.

6. An exhaust system of a motor vehicle, comprising:
   a tailpipe which has an essentially cylindrical pipe end section with a free pipe end; and
   a tailpipe cover which is fitted onto the free pipe end of the tailpipe, the tail pipe cover comprising
      a cover pipe that has a pipe axis and is fittable onto a tailpipe of the exhaust system;
      a positioning element arranged on a radial interior side of the cover pipe;
      a plurality of fastening elements arranged separately from the positioning element on the radial interior side of the cover pipe, the plurality of fastening elements being configured to fix the tailpipe cover to the tailpipe in a radial direction and in an axial direction, wherein
   the fastening elements of the tailpipe cover are acted upon radially with respect to the tailpipe and support themselves radially on an exterior side of the tailpipe,
      the pipe end section of the tailpipe has a radial tailpipe projection which engages in a recess of the positioning element of the tailpipe cover, and
      the positioning element is configured to position the tailpipe cover relative to the tailpipe in a circumferential direction.

7. The exhaust system according to claim 6, wherein the tailpipe projection and the recess establish an interlocking connection that is largely play-free in the circumferential direction in a final mounted position of the tailpipe cover.

8. The exhaust system according to claim 7, wherein the tailpipe cover is axially guided, via an interaction between the recess and the tailpipe projection, during the fitting onto the tailpipe.

9. The exhaust system according to claim 6, wherein the tailpipe cover is axially guided, via an interaction between the recess and the tailpipe projection, during the fitting onto the tailpipe.

10. The exhaust system according to one of claim 8, wherein
    the positioning element forms an axial stop for the tailpipe projection in the final mounted position of the tailpipe cover.

11. The exhaust system according to one of claim 6, wherein
    the positioning element forms an axial stop for the tailpipe projection in the final mounted position of the tailpipe cover.

12. The exhaust system according to claim 6, wherein the cover pipe has an essentially slot-free and borehole-free design.

13. The exhaust system according to claim 6, wherein the fastening elements comprise radially elastic fastening clamps and fastening claws that are provided at ends of the fastening elements.

14. The exhaust system according to claim 6, wherein the recess of the positioning element, viewed in the axial direction, has a changeable tangential dimension.

15. The tailpipe cover according to claim 1, wherein the positioning element is arranged on a most radially inward surface of the cover pipe.

16. The exhaust system according to claim 6, wherein the positioning element is arranged on a most radially inward surface of the cover pipe.

17. The tailpipe cover according to claim 15, wherein the positioning element has at least two walls that extend along a direction of the pipe axis and that define boundaries along the circumferential direction of the tailpipe cover.

18. The tailpipe cover according to claim 17, wherein the positioning element has a third wall that extends along a direction that is orthogonal to the pipe axis, the third wall being coupled to a first end of the at least two walls and thereby defining a boundary along pipe axis.

19. The exhaust system according to claim 16, wherein the positioning element has at least two walls that extend along a direction of the pipe axis and that define boundaries that limit free motion of the radial tailpipe projection along the circumferential direction of the tailpipe cover.

20. The exhaust system according to claim 19, wherein the positioning element has a third wall that extends along a direction that is orthogonal to the pipe axis, the third wall being coupled to a first end of the at least two walls and thereby defining a boundary that limits free motion of the radial tailpipe projection along the pipe axis.

* * * * *